United States Patent [19]

Doi et al.

[11] 4,279,698
[45] Jul. 21, 1981

[54] NUCLEAR REACTOR OPERATION CONTROL PROCESS

[75] Inventors: Toshiaki Doi, Shimane; Shigeru Suematsu, Hitachi; Chikamasa Nishida, Hitachi; Hiroshi Hiranuma, Hitachi, all of Japan

[73] Assignee: Hitachi, Ltd., Tokyo, Japan

[21] Appl. No.: 31,159

[22] Filed: Apr. 18, 1979

Related U.S. Application Data

[63] Continuation of Ser. No. 762,248, Jan. 25, 1977, abandoned.

[51] Int. Cl.³ .............................................. G21C 7/06
[52] U.S. Cl. .................................. 176/22; 176/20 R; 176/38
[58] Field of Search .............. 176/22, 20 R, 24, 25, 176/19 R, 38

[56] References Cited

U.S. PATENT DOCUMENTS

| | | | |
|---|---|---|---|
| 3,565,760 | 2/1971 | Parkos | 176/24 |
| 4,016,034 | 4/1977 | Musick | 176/24 |
| 4,057,466 | 11/1977 | Thompson | 176/19 R |

FOREIGN PATENT DOCUMENTS

50-143999 11/1975 Japan ............................................ 176/22

OTHER PUBLICATIONS

Steinar, Nuclear Engineering & Design, 33 (1975), pp. 261–268.
Niki, et al., "Operating Experience of Shimane Nuclear Power Station, etc.", Hitachi Review, vol. 25 (1976), No. 3., pp. 97–102.

Primary Examiner—Donald P. Walsh
Attorney, Agent, or Firm—Craig and Antonelli

[57] ABSTRACT

A process for controlling operation of a nuclear reactor in which first control means is operated to cause reactor power to rise to a level at which a pellet-clad-mechanical-interaction begins to take place between a cladding and pellets of a fuel element. After interrupting the operation of the first control means, second control means is operated to cause the reactor power to rise to a preset level, the second control means being capable of effecting finer control of the reactor power than the first control means. When the reactor power deviates from the preset level with the progress of the reactor operation in the preset level, the second control means is operated so as to maintain the reactor power at the preset level.

34 Claims, 8 Drawing Figures

NUCLEAR REACTOR OPERATION CONTROL PROCESS

This is a continuation of application Ser. No. 762,248, filed Jan. 25, 1977 now abandoned.

BACKGROUND OF THE INVENTION

This invention relates to nuclear reactor operation control processes, and more particularly to a process of the type described which eliminates the hazards of causing damage to nuclear fuel.

There are many type of a nuclear reactor. For example, a boiling-water reactor includes control rods and recycling systems which are important means for controlling the reactivity of the reactor and hence to control reactor power. The control rods, each of which contains boron carbide, are inserted into and withdrawn from the core so as to thereby control reactor power. For example, a boiling-water type nuclear power plant with a power output capacity of 460 MW uses about 97 control rods. Each of the recycling systems includes recycling system pipes, a jet pump and a recirculation pump. An increase in the volume of water delivered by each recirculation pump causes an increase in the flow rate of cooling water delivered to the core through each jet pump. An increase in the flow rate of cooling water flowing through the core results in a reduction in the density of steam voids produced in the core. Because of this phenomenon, each neutron is slowed down satisfactorily and the reactivity rises, thereby causing an increase in reactor power. Conversely, if the volume of water delivered by each recirculation pump decreases, then the flow rate of cooling water flowing through the core is reduced and the density of steam voids becomes high. This causes a reduction in the reactivity and a fall in reactor power.

A conventional process for controlling operation of a nuclear reactor will be described with reference to a boiling-water reactor. Generally, in a boiling-water reactor, there are provided two recycling systems. When reactor power is to be increased to 100% level, the control rods are withdrawn from the core while the recirculation pump of each system is operated at a 20% pump revolution speed. At this time, reactor power rises along a 20% pump revolution speed line. Withdrawing of the control rods is continued until the reactor power reaches an intersection of the 20% pump revolution speed line and a control rod pattern 100% constant line. Upon the reactor power reaching the intersection, withdrawing of the control rods is interrupted and control of the reactor power is effected by means of the recycling systems. More specifically, the pump revolution speed of each recirculation pump is increased, thereby causing the reactor power to rise slowly. The rise in reactor power is effected by gradually increasing the flow rate of cooling water flowing through the core so that the rise in reactor power may take place along the control rod pattern 100% constant line and the rate of increase in a linear heat generating rate may not exceed 0.06 KW/ft.hr at any and every point in the nuclear reactor. This is because where the increase in the linear heat generating rate exceeds the aforesaid level, there will arise an increased interaction between the cladding and the fuel pellets constituting each of the nuclear fuel elements, which will cause damage to the cladding and thus the nuclear fuel elements.

The increase of the flow rate of cooling water causes the reactor power to rise to a 100% level along the control rod pattern 100% constant line. That is, the reactor power moves on the control rod pattern 100% constant line from the above-mentioned intersection to a point where the flow rate of cooling water and the reactor power is both at a 100% level. With the lapse of the operation time of the nuclear reactor, the reactivity in the core is lowered due to consumption of the fuel and the reactor power falls. To compensate for this reduction in reactor power, steps must be taken to maintain the reactor power at the 100% level. It should be noted, however, that it is not desirable to increase the flow rate of cooling water flowing through the core to a level above the 100% level because this will induce caviation in the pumps of the recycling systems. For this reason, the control rods are further withdrawn from the core to prevent the fall in reactor power. However, it has detrimental effects on the nuclear elements to control the reactor power by manipulating the control rods when the reactor power is at a high level, since there is a danger of break of the fuel.

The above discussion is also applicable to the case where reactor power is preset to a 75% level and it is increased to this level. Withdrawing of the control rods is continued until the reactor power rises along the 20% pump revolution speed line and reaches an intersection of the 20% line and a control rod pattern 75% constant line. Then, the reactor power is caused to slowly rise along the control rod pattern 75% constant line by increasing the flow rate of cooling water as mentioned above, and reaches the 75% level. There will be the same problem as the case of the preset power level of a 100% level in manipulating the control rods at a high level of the reactor power.

SUMMARY OF THE INVENTION

An object of this invention is to provide a nuclear reactor operation control process which permits break of the nuclear fuel elements disposed in the core of a nuclear reactor to be avoided.

Another object is to provide a nuclear reactor operation control process which permits break of the nuclear fuel elements disposed in the core of a nuclear reactor to be avoided when attempts are made to cause reactor power to rise.

Still another object is to provide a nuclear reactor operation control process in which a fall in reactor power below a preset level with the lapse of time for operating a nuclear reactor can be compensated for by an increase in the flow rate of cooling water flowing through the core of the reactor.

A further object is to prevent break of nuclear fuel elements by making use of fission products produced within the nuclear fuel element.

According to one aspect of this invention, there is provided a process for controlling operation of a nuclear reactor including fuel elements in a reactor core each having a cladding and fuel pellets, first control means for reactor power, and second control means capable of effecting finer control of the reactor power than said first control means, comprising the steps of: operating said first control means to cause the reactor power to rise; interrupting the operation of said first control means when the reactor power has risen to a level at which a pellet-clad-mechanical-interaction begins to take place between said cladding and pellets; operating said second control means to cause the reactor power to rise to a preset level; and operating said second control means when the reactor power deviates from said preset level with the progress of the reactor operation in the preset level thereby to maintain the reactor power at the preset level.

Also, according to another aspect of this invention, there is provided a process for controlling operation of a nuclear reactor including fuel elements in a reactor core each having a cladding and fuel pellets, first control means for reactor power, and second control means capable of effecting finer control of the reactor power than said first control means, comprising the steps of: operating said first control means to cause the reactor power to rise; interrupting the operation of said first control means when the reactor power has risen to a level at which a pellet-clad-mechanical-interaction begins to take place between said cladding and pellets; operating said second control means to cause the reactor power to rise to an arbitrarily selected level; operating said second control means to cause the reactor power to fall to a level below the level at the interruption of the operation of said first control means; operating said first control means to cause the reactor power to rise to the level at which the pellet-clad-mechanical-interaction begins to take place; and operating said second control means after interruption of the operation of said first control means so as to cause the reactor power to rise to a preset level.

In the preferred embodiments of the above-mentioned process, the rise of the reactor power to the preset level brought by operating said second control means is conducted at a lower rate than a critical rate at which the pellet-clad-mechanical-interaction begins to cause damage to said fuel element. Said rate of the reactor power rise is equal to or below 0.06 KW/ft.hr.

Other objects and features of the invention will be apparent from the following description taken in connection with the accompanying drawings.

DESCRIPTION OF THE PREFERRED EMBODIMENTS

This invention is based on the discovery made after carrying out studies on break of nuclear fuel. Before describing in detail the results of the studies, a boiling-water reactor in which one embodiment of the invention can have application will be outlined with reference to FIG. 1. A core 1 is formed in a pressure vessel 4 of the reactor and comprises a number of fuel assemblies arranged therein. There are provided control rods 17 which are adapted to be inserted into and withdrawn from the core 1. A steam separator 2 and a steam dryer 3 are mounted over the core 1. Jet pumps 18 are disposed within the pressure vessel 4, with one end of each of recycling system pipes 13 opening at the inlet side of one of the jet pumps 16. Each of the recycling system pipes 13 mounts therein a recirculation pump. When the recirculation pumps 19 are driven, cooling water is supplied to the core 1 through the recirculation system pipes 13 and the jet pumps 18. The cooling water supplied to the core is heated therein and converted into steam which passed through the steam separator 2 and steam dryer 3 to be carried off to a main steam line 14 connected to the pressure vessel 1. After driving a turbine 5, the steam is condensed by a condenser 6 and changed back into water which is passed from the condenser 6 to the pressure vessel 4 through a condensate pump 7, a condensate desalinator 8, a condensate pressure raising pump 9, a low pressure feed water heater 10, a feed water pump 11 and a high pressure feed water heater 12 which are mounted in a condensate supply passage 15.

Figure 1:
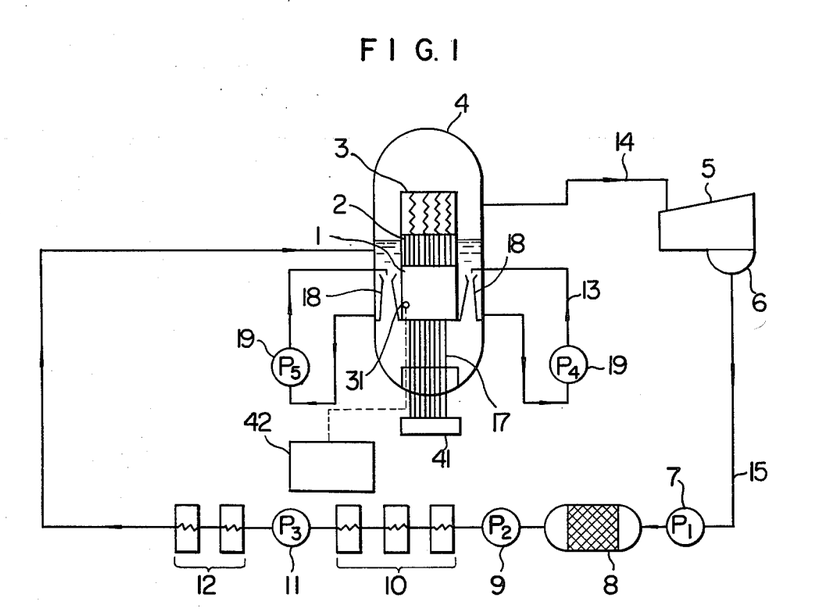
FIG. 1 is a systematic diagram of a boiling-water reactor in which the nuclear reactor operation control process comprising one embodiment of this invention can have application.

The boiling-water reactor is provided with the control rods and recycling systems which are important means for controlling the reactivity in the reactor and hence to control reactor power. The control rods, each of which contains boron carbide, are inserted into and withdrawn from the core so as to control reactor power. For example, a boiling-water reactor power plant with a power output capacity of 460 MW uses about 97 control rods. Each of the recycling systems includes the recycling system pipe 13, jet pump 18 and recirculation pump 19. If the volume of water delivered by each of the recirculation pumps 19 is increased, then the flow rate of cooling water supplied to the core 1 through the jet pumps 18 increases. Neutron detectors 31 are inserted in the core 1.

Figure 2:
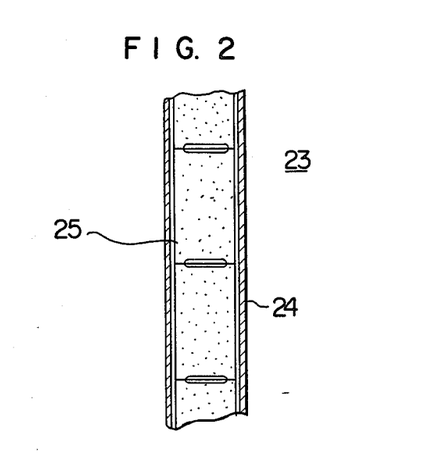
FIG. 2 is a fragmentary vertical sectional view of a nuclear fuel element disposed in the core of the boiling-water reactor shown in FIG. 1.
Figure 3:
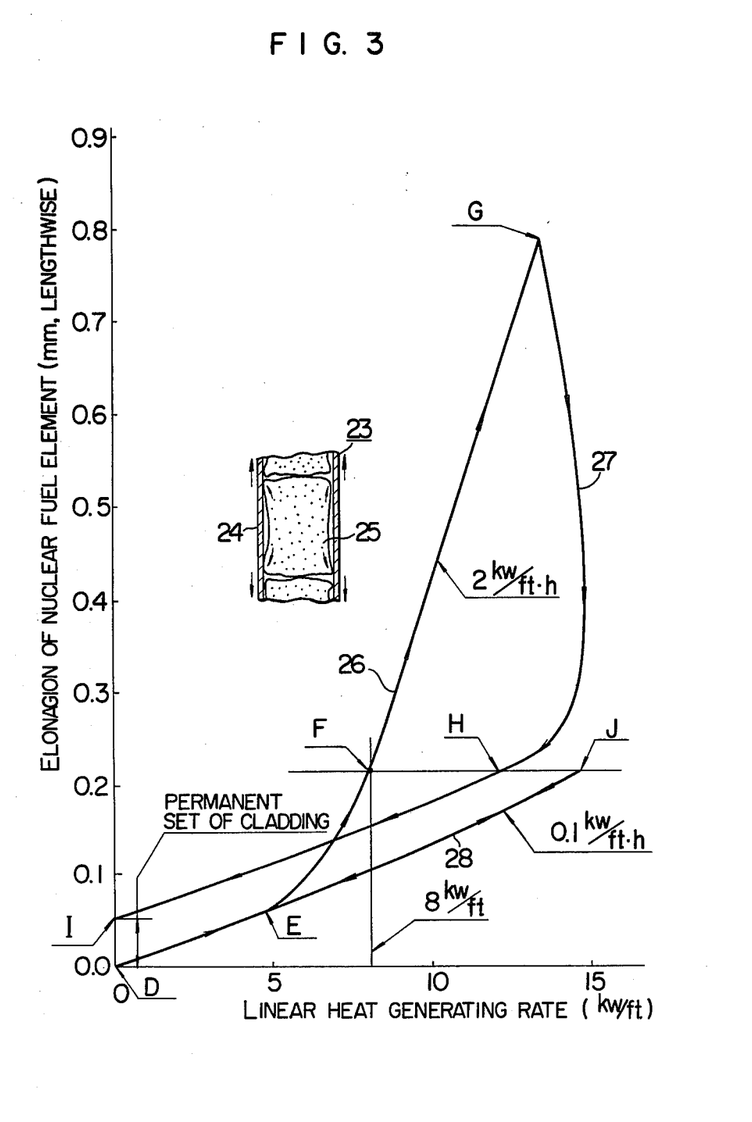
FIG. 3 is a graph showing the relation between the linear heat generating rate and the elongation of a nuclear fuel element.

The results of studies on break of nuclear fuel will hereinafter be discussed. Referring to FIG. 2, a nuclear fuel element 23 includes a large number of fuel pellets 25 obtained by sintering uranium dioxide and charged in a cladding 24 of a tube made of zircaloy. Although not shown, the cladding 24 is sealed at opposite ends thereof with end plugs. In one known example, a fuel assembly consists of 49 nuclear fuel elements 23. When a nuclear reactor having such fuel assemblies in place in the reactor core is operated, the axial elongation of each nuclear fuel element 23 shows a change as illustrated in FIG. 3 with an increase in linear heat generating rate. The elongation of the nuclear fuel element 23 shown in FIG. 3 represents an elongation of the longitudinal dimension (about 20 mm) of one fuel pellet 25. When the reactor power rises, each fuel pellet 25 is deformed into a handdrum shape, with the result that upper and lower ends of each fuel pellet 25 are brought into contact with the wall of the cladding 24. A further rise in the reactor power leads to bitting of opposite edges of upper and lower end portions of each pellet 25 into the wall of the cladding 24. This causes the wall of the cladding to be deformed in such a manner that the cladding appears as a bamboo having nodes in outer appearance. The phenomenon of the fuel pellets biting into the cladding is referred to as a pellet-clad-mechanical-interaction (hereinafter referred to as PCMI).

As the cladding 24 undergoes deformation in this way, the elongation of the fuel element 23 shows a variation as represented by a curve 26 (D-E-F-G). The variation in elongation as represented by the curve 26 is obtained when the rate of increases in the linear heat generating rate is about 2 KW/ft.hr. From the time at which the reactor is started till the time at which the fuel pellets 25 are brought into contact with the wall of the cladding (D-E), the elongation of the cladding 24 or fuel element 23 is solely due to thermal expansion. When the fuel pellets 25 are deformed and brought into contact with the cladding 24, then the elongation of the fuel element 23 is increased (E-F). At the linear heat generating rate of about 8 KW/ft, the fuel pellets 25 begin to bite into the cladding 24. When the value of the linear heat generating rate becomes higher than about 8 KW/ft, since the elongation of the fuel pellets 25 is larger than that of the cladding 24, the cladding 24 is stretched by the opposite ends of the fuel pellets 25 biting into the cladding 24. The PCMI commences when the linear heat generating rate reaches the level of about 8 KW/ft.

When the value of the linear generating rate is below about 8 KW/ft, the elongation of the cladding 24 is within the limit of elasticity. However, if the elongation of the nuclear fuel element 23 takes place beyond the limit, the cladding 24 undergoes plastic deformation. In case the elongation of the cladding 24 occurs on a large scale in the plastic deformation range, the cladding 24 and hence the nuclear fuel element 23 becomes susceptible to damage. If the reactor power is lowered after the elongation of the nuclear fuel element 23 undergoes a change as shown by the curve 26 and the elongation thereof reaches a point G, the elongation of the nuclear fuel element 23 will undergo a variation as shown by a curve 27 (G-H-I). Once the elongation of the nuclear fuel element 23 has reached the point G, a permanent strain (corresponding to ID) will occur in the nuclear fuel element 23 even if the linear heat generating rate is reduced to zero. A curve 28 (D-J) shows a change of the elongation of the nuclear fuel element 23 occurring when the linear heat generating rate is increased at a rate of about 0.1 KW/ft.hr. At this time, the fuel pellets 25 undergo plastic deformation due to the spring back action of the cladding 24 which is performed over an extended period of time. Thus, the cladding 24 remains well within the limit of elasticity (point J) even when the linear heat generating rate reaches a 100% level, so that the cladding 24 does not undergo a permanent strain even if the linear heat generating rate is reduced to zero.

As has been described above, if there is a shap rise in reactor power when the value of the reactor power is equal to or above the reactor power level at which the PCMI commences, the cladding will undergo a permanent strain. If a sharp rise and fall of the reactor power is repeated, the nuclear fuel element will finally break.

In case the linear heat generating rate is increased at a rate of about 2 KW/ft.hr with the nuclear fuel element having a permanent strain as indicated by a point I, the elongation of the nuclear fuel element 23 will occur from the point I in the same manner as shown by the curve 26. When the reactor power is lowered thereafter, the rate of elongation will be reduced in the same manner as shown by curve a 27. In this case, even if the linear heat generating rate is reduced to zero, the elongation will not coincide with the point I and a permanent strain will further be added to the nuclear fuel element. A repeated sharp rise and fall of nuclear power will thus lead to gradual accumulation of permanent strains, with a result that the nuclear fuel element becomes liable to break. The same is true of the radial dimension of the cladding 4. In actual practice, the elongation of the radial dimension of the cladding 24 is severer than the elongation of the longitudinal dimension thereof.

Figure 4:
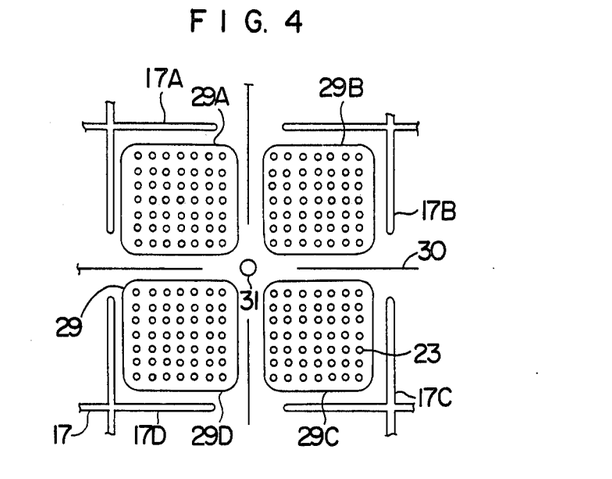
FIG. 4 is a fragmentary horizontal cross-sectional view of the core of the boiling-water reactor shown in FIG. 1.

FIG. 4 shows, in a fragmentary horizontal sectional view, four fuel assemblies 29 each consisting of 49 nuclear fuel elements 23 and arranged in the core 1 of a nuclear reactor. The four fuel assemblies 29 are arranged with a neutron detector 31 being disposed in the center. Four control rods 17 are disposed in a manner to surround the four fuel assemblies 29. Poison curtains 30 are each located between the adjacent fuel assemblies 29.

Figure 5:
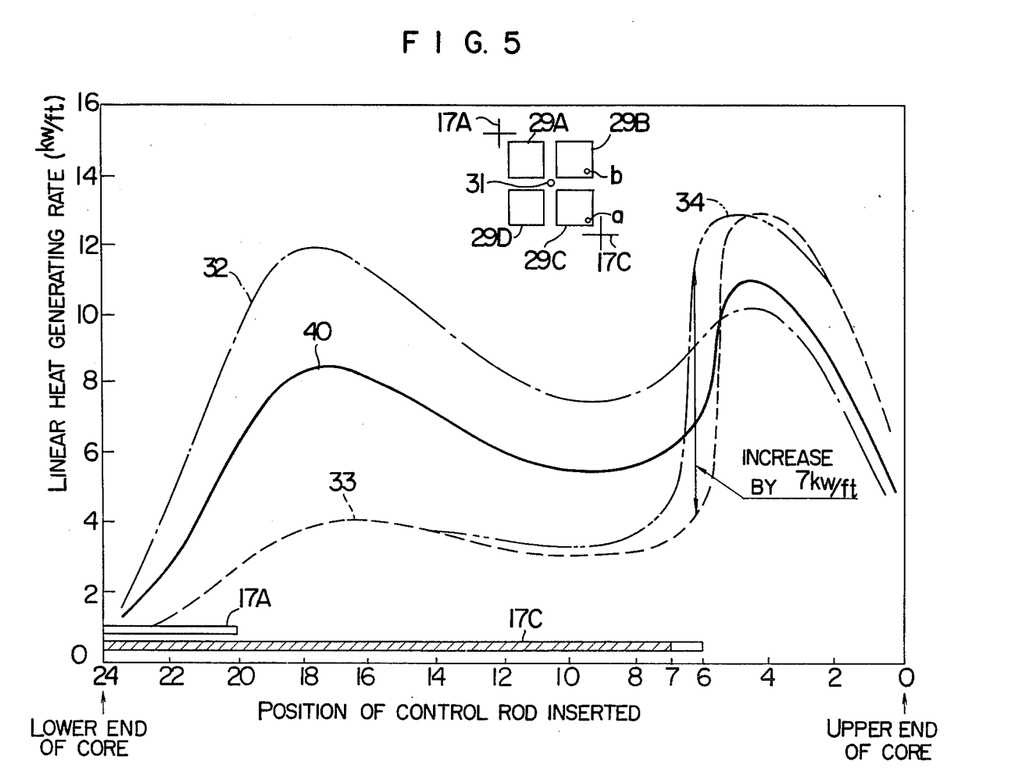
FIG. 5 is a graph showing a variation in the linear heat generating rate which occurs when the control rods are withdrawn from the core of the boiling-water reactor shown in FIG. 1.

FIG. 5 shows a variation in the distribution of power developed by the fuel assemblies 29 as the control rods 17 are moved in the core 1 in the construction shown in FIG. 4. Each control rod 17 can be moved stage by stage (one stage is about 15 cm in length) through 24 stages to which the longitudinal dimension of each control rod 17 is divided. The fuel assemblies 29 shown in FIG. 4 are shown schematically in an upper portion of FIG. 5. As shown, four fuel assemblies 29A, 29B, 29C and 29D are arranged about the neutron detector 31, with control rods 17A and 17C disposed adjacent the fuel assemblies 29A and 29C respectively being inserted in the core 1. Control rods 17B and 17D (not shown in FIG. 5) disposed adjacent the fuel assemblies 29B and 29D respectively are not inserted in the core 1 yet. The control rod 17A is inserted in the core 1 and disposed in the twentieth stage as counted from the top of the core 1, while the control rod 17C is disposed in the sixth stage of the core 1 as counted from the top of the core. In no case are the control rods 17A and 17C inserted in the core 1 in such a manner that the upper ends thereof are flush with each other. The average axial power distribution of the fuel assembly 29C is shown by a solid line curve 40 in FIG. 5. In the same figure, a curve 32 of a one point chain type shows the axial power distribution of the nuclear fuel element 23 located in a position b in the fuel assembly 29B, and a broken line curve 33 shows the axial power distribution of the nuclear fuel element 23 located in a position a in the fuel assembly 29C. It will be seen that the power developed by the nuclear fuel element 23 in the position a shows a remarkable change near the upper end of the control rod 17C.

The control rod 17C is withdrawn or moved by one stage from the sixth to the seventh stage. This causes no appreciable change in the axial power distribution of the nuclear fuel element 23 in the position b in the fuel assembly 29B and in the average axial power distribution of the fuel assembly 29C. However, this causes a change, as shown by a curve 34 of a two point chain system, in the axial power distribution of the nuclear fuel element 23 in the position a in the fuel assembly 29C. Because of this change, the linear heat generating rate is increased by about 7 KW/ft in a portion of the nuclear fuel element 23 of the position a which corresponds to the sixth stage of the core 1 as shown in FIG. 5. Since it takes about 1 second to move the control rod 17C from one stage to the next stage, the is about scores of thousands of times the rate of increase in the linear heat generating rate of 0.1 KW/ft.hr described with reference to FIG. 3. Because of this sudden increase in the linear heat exchange rate, the fuel pellets 25 quickly undergo deformation and the cladding 24 undergoes plastic deformation, because there is not enough time left for the fuel pellets 25 to undergo plastic deformation due to the action of the cladding 24 to hold the pellets 25 in position. If this phenomenon is allowed to occur repeatedly in the same portion of the nuclear fuel element, the cladding 24 will be broken and the fission products produced in the nuclear fuel element 23 and the nuclear fuel itself will leak into the cooling water.

If any of the control rods 17 is withdrawn from the core 1 in order to compensate for a reduction in the reactivity due to consumption of the fuel and to maintain reactor power at a 100% level, there will occur a sudden increase in the linear heat generating rate in some portion of the associated nuclear fuel element 23 as aforementioned. Such sudden change in the linear heat generating rate increases the rate of elongation of the nuclear fuel element 23 as shown in FIG. 3, and causes the elongation to occur locally. Since the aforementioned elongation occurs in addition to the elongation which occurs in the nuclear fuel element 23 until the reactor power reaches a 100% level, the nuclear fuel element 23 is liable to be damaged.

In view of the situation described above, control of the reactor power is effected in the present invention in such a manner that, in a region where there is a high flow rate of coolant in the core, no control rods are driven and the quantity of coolant flowing through the core is varied so as to control the reactor power. By using this method, the invention is capable of providing a nuclear reactor operation control process which causes no damage to the fuel.

Figure 6:
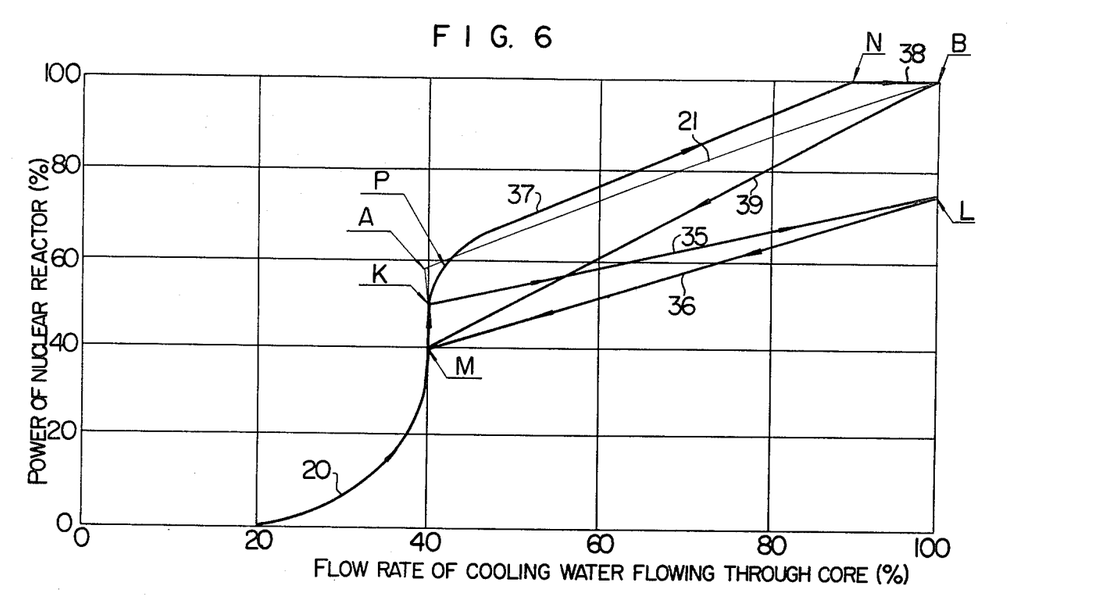
FIG. 6 is a graph showing the relation between the flow rate of cooling water flowing through the core and the value of reactor power, which is exhibited when the nuclear reactor operation control process comprising one embodiment of the invention is applied to the boiling-water reactor shown in FIG. 1.
Figure 7:
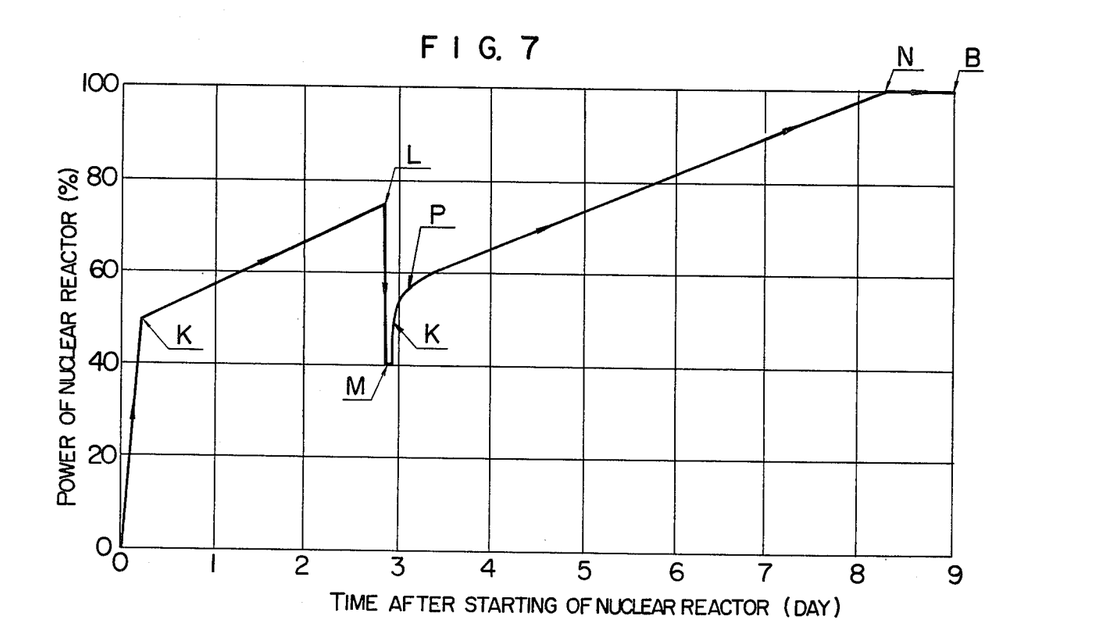
FIG. 7 is a graph showing the relation between the value of the reactor power and the time elapsing after the nuclear reactor is started, with particular reference to an increase in the reactor power.

The nuclear reactor operation control process comprising one embodiment of the invention will be described with reference to FIGS. 1, 6 and 7 by setting the reactor power at a 100% level. In a boiling-water reactor having a power generating capacity of 460 MW, the control rods 17 are successively withdrawn from the core 1 by means of a control rod drive mechanism 41 while cooling water is caused to flow to the core 1 by operating the recirculation pumps 19 at a 20% level of its full speed of revolution. The reaction in the reactor will become critical in due course. Further withdrawing of the control rods 17 from the core 1 results in the reactor power rising along a characteristic line 20 (20% pump revolution speed line) in FIG. 6. During this time, the speed of revolution of the recirculation pumps 19 is kept at a 20% level, but the flow rate of water flowing through the core 1 increases as shown by the characteristic curve 20 with a rise in reactor power.

The reactor power will increase and the linear heat generating rate of the nuclear fuel elements 23 will reach a level of about 8 KW/ft at which the PCMI commences. When this level is reached, withdrawing of the control rods 17 from the core 1 by means of the control rod drive mechanism 41 is interrupted. The reactor power at this time is at a level of about 50% (as shown at a point K in FIG. 6). The linear heat generating rate is proportional to the reactor power. FIG. 7 shows the process of a rise in reactor power to its preset level in relation to the time elapsing after the reactor is started and the power developed by the reactor. The point K in FIG. 7 coincides with the point K in FIG. 6.

Upon the reactor power reaching the point K, the speed of revolution of the recirculation pumps 19 is increased so as to gradually increase the flow rate of cooling water flowing through the core 1. The speed of revolution of the recirculation pumps 19 is adjusted such that the rate of increase in the linear heat generating rate will be equal to or below 0.06 KW/ft.hr. The increase of 0.06 KW/ft.hr corresponds to an increase of about 0.4%/hr of the reactor power. By changing the flow rate of cooling water flowing through the core, it is possible to control the reactor power more finely than by driving the control rods. When the reactor power is caused to rise slowly along a characteristic line 35 in FIG. 6, the flow rate of cooling water flowing through the core 1 reaches a 100% level at a point L on the line 35. The increase of 0.06 KW/ft.hr in linear heat generating rate is lower in rate than a critical rate at which break of the nuclear fuel elements 23 is caused by the PCMI. The reactor power is at a level of about 75% when the flow rate of cooling water has reached the point L. Since it is impossible to increase the flow rate of cooling water flowing through the core 1 above the 100% level, it is generally impossible to cause the reactor power to rise to a higher level unless the control rods 17 are further withdrawn from the core 1. However, withdrawing of the control rods 17 from the core 1 at the point L leads to a sharp rise in the reactor power and tends to cause break of the nuclear fuel elements 23 in the core 1. Therefore, the flow rate of cooling water through the core 1 is rapidly reduced so as to cause the reactor power to fall along a characteristic line 36 to an intersection M of the line 36 with the line 20. Although the control rods 17 withdrawn from the core 1 remain the same in level, the reactor power is lower at the point M than at the point K, while the flow rate of cooling water through the core 1 is substantially equal at the points M and K. The occurrence of this phenomenon is attributed to the production, in the nuclear fuel elements 23 in the core 1, of fission products, particularly $^{135}$Xe, which has a neutron absorbing effect due to the rise of the reactor power from the point K to the point L. That is, the quantity of $^{135}$Xe in the nuclear fuel elements 23 is greater at the point M than at the point K. Since the reactor power at the point M is at a level of 40% and the linear heat generating rate is below the level of about 8 KW/ft, it is possible to further withdraw the control rods 17 from the core 1. Further withdrawing of the control rods 17 causes the reactor power to rise along the line 20 and reach the point K. When the reactor power has reached the point K, withdrawing of the control rods 17 is interrupted and then the flow rate of cooling water through the core 1 is increased. The amount of $^{135}$Xe in the nuclear fuel elements 23 decreases with time. It is necessary to carry out withdrawing of the control rods 17 for causing the reactor power to rise from the point M to the point K in the presence of $^{135}$Xe.

The further increase in the flow rate of cooling water through the core 1 results in an increase in the reactor power along a characteristic line 37 which is disposed above a control rod pattern 100% constant line 21, and the reactor power reaches the preset 100% level at a point N. At this time, the flow rate of cooling water through the core 1 is about 90%. A rise portion from the point K to a point P represents a rise in the reactor power caused by the increase in the flow rate of cooling water plus a rise in the reactor power due to a reduction in the amount of $^{135}$Xe. The rate of rise in the linear heat generating rate along the line 37 is 0.06 KW/ft.hr which is similar to the rise along the line 35. The manner in which the reactor power changes from zero through lines K-L-M-K-P-N as shown in FIG. 6 is also shown by lines connecting the points K, L, M, K, P and N in FIG. 7.

The process steps, in which a rise and fall of the reactor power is effected as shown by lines K-L-M by increasing and reducing the flow rate of cooling water through the core before the reactor power reaches the present 100% level and withdrawing of the control rods is performed by utilizing the neutron absorbing effect of $^{135}$Xe which is produced by the rise of the reactor power from the point K to the point L, are followed only once in this embodiment. However, it is to be understood that such process steps may be followed twice, if necessary. By utilizing the aforementioned process steps for causing the reactor power to rise, it is possible to make use of the neutron absorbing effect of $^{135}$Xe. This enables the reactor power to rise to its preset 100% level without damaging the nuclear fuel elements. The rate of increase in the rise of reactor power due to the reduction of $^{135}$Xe is lower than the rate of increase in the rise of reactor power due to withdrawing of the control rods. The reactor power at the point L, which is higher than the reactor power at the point K, is an arbitrarily selected level.

In the event that a nuclear reactor is started after being shut down for a long period of time, reactor power is not caused to rise at a stretch to the point P but is caused to vary so that the reactor power follows lines K-L-M. During these process steps, $^{135}$Xe which has the neutron absorbing effect is produced. This effect is utilized in effecting control of operation of the nuclear reactor. This type of operation is necessary by the fact that operation of the control rods 17 is liable to cause damage to the fuel if such operation is performed when the linear heat generating rate is at or above the level of about 8 KW/ft.

In this embodiment, the characteristic line 37 is present in the region above the control rod pattern 100% constant line 21. If the reactor power is caused to rise along the line 37, the reactor power reaches the present 100% level when the flow rate of cooling water is about 90%. A nuclear reactor is operated such that reactor power is kept at a 100% level. However, it should be noted that the reactivity is gradually reduced with consumption of the nuclear fuel in the nuclear fuel elements 23 in the core 1, causing a fall in the reactor power. When such phenomenon occurs, the speed of the recirculation pumps 19 is increased to thereby increase the flow rate of water through the core 1. By performing this process step, it is possible to maintain the reactor power at the 100% level as indicated by a line 38 in FIG. 6. Thus, the need to operate the control rods 17 as has hitherto been done to prevent a reduction in the reactivity is eliminated and the nuclear power can be maintained at the 100% level as indicated by a line N-B in FIG. 7 merely by controlling the flow rate of cooling water through the core 1 in the present invention. The end of increasing the length of the line N-B can be conveniently achieved by bringing the line 37 close to a rod block line (not shown). The rod block line indicates, as described in U.S. Pat. No. 3,565,760 as a rod block threshold, a reactor power level at which a rod block system is actuated to prevent withdrawing of the control rods 17 from the core in order to prevent a rise of the reactor power to an abnormally high level.

If the flow rate of cooling water flowing through the core 1 reaches a 100% level or the point B, it is impossible to further increase the flow rate of cooling water through the core 1. When the flow rate of cooling water reaches the point B, the flow rate is decreased and the reactor power falls along a characteristic line 39 to a level in the vicinity of the point M. This phenomenon is attributed to the presence of $^{135}$Xe which is accumulated in the nuclear fuel elements 23 until the reactor power reaches the point B. The fall of the reactor power to the point M puts an end to the decrease in the flow rate of water flowing through the core 1. The control rod pattern for the preset reactor power 100% undergoes a change at the point M. More specifically, the control rod pattern which has hitherto been used is a first control rod pattern in which, with reference to FIG. 5, the control rod 17C is inserted deep into the core 1 and the control rod 17A is inserted less deep thereinto while the control rods 17B and 17D (not shown) are not inserted in the core 1. The control rod pattern is switched quickly from the aforesaid first pattern to a second control rod pattern in which the control rod 17C is withdrawn to the position in which the control rod 17A is disposed in the first pattern and the control rod 17A is moved into the position in which the control rod 17C is disposed in the first pattern. This operation causes little change in reactor power. The control rods 17 are withdrawn when the value of the reactor power is in a range below a reactor power level at which the PCMI begins to take place, thereby causing the reactor power to rise from the point M to the point K. Thereafter, the flow rate of cooling water flowing through the core 1 is increased. The $^{135}$Xe in the nuclear fuel elements 23 decreases by absorbing neutron, and the reactor power rises along the characteristic line 37 from the point K to the point N. Upon the reactor power reaching the point N, control of the reactor power is effected so that it may keep moving along the line 38. Upon the reactor power reaching the point B, the reactor power is caused to fall along a characteristic line 39 from the point B to the point M at which the control rod pattern is switched from the second control rod pattern to a third control rod pattern. In the third control rod pattern the control rod 17D is inserted into the position of the control rod 17C in the first control rod pattern and the control rod 17B is inserted into the position of the control rod 17A in the first control rod pattern while the control rods 17A and 17C are withdrawn from the core 1. After the control rod pattern is switched to the third pattern, the nuclear reactor operates such that the reactor power rises and falls along the characteristic lines 37, 38 and 39. Upon the reactor power reaching the point M again, the control rod pattern is switched from the third to a fourth control rod pattern in which the depth of insertion of the control rods 17B and 17C in the third control rod pattern is reversed. And the nuclear reactor operates in such a manner that the reactor power follows the lines M-K-P-N-B-M as aforementioned.

Thereafter, the control rod pattern is successively switched to a fifth pattern, a sixth pattern, a seventh pattern and so on, and the nuclear reactor operates each time in such a manner that the reactor power follows the lines M-K-P-N-B-M. Where the operation of the nuclear reactor is performed as aforementioned, the control rod pattern is only switched from one pattern to another when the flow rate of cooling water flowing through the core 1 is about 50%, so that it is possible to keep the nuclear reactor operating for a long period of time by controlling the flow rate of cooling water flowing through the core 1 without causing damage to the fuel. Operation of the control rods may be performed when the flow rate of cooling water flowing through the core 1 is less than about 50%.

In performing control of operation of a nuclear reactor in the aforementioned manner, the operation of the control rods 17 or control of the flow rate of cooling water flowing through the core 1 is effected by the operator who keeps his eyes on the reactor power indicated by an indicating device 42 and depresses a button for actuating the control rod drive mechanism 41 or operates means for changing the speed of the recirculation pumps 19 which button and means are mounted on a control board.

The invention has been described with reference to an embodiment in which the reactor power is preset at a 100% level. It is to be understood, however, that the invention can also have application in an embodiment in which the nuclear reactor is operated under a partial load of 90%, 80% or 70%. The operation of a nuclear reactor under a partial load will be described by taking, as an example, the operation of a nuclear reactor in which the reactor power is set at an 80% level. In this example, the reactor power is caused to rise from zero to the point P through the lines K-L-M-K-P in the same manner as described with reference to the embodiment shown and described hereinabove. Thereafter, the reactor power is caused to rise along the characteristic line 37, and when the reactor power has reached the preset 80% level, the increase in the flow rate of cooling water flowing through the core 1 is stopped. The reactor power is kept at the 80% level. If the reactor power falls with consumption of the fuel as aforementioned, the flow rate of cooling water is increased so as to keep the reactor power at the 80% level. It is added that the control rod pattern 100% constant line and control rod pattern 75% constant line are generally referred to as a control rod pattern constant line.

Figure 8:
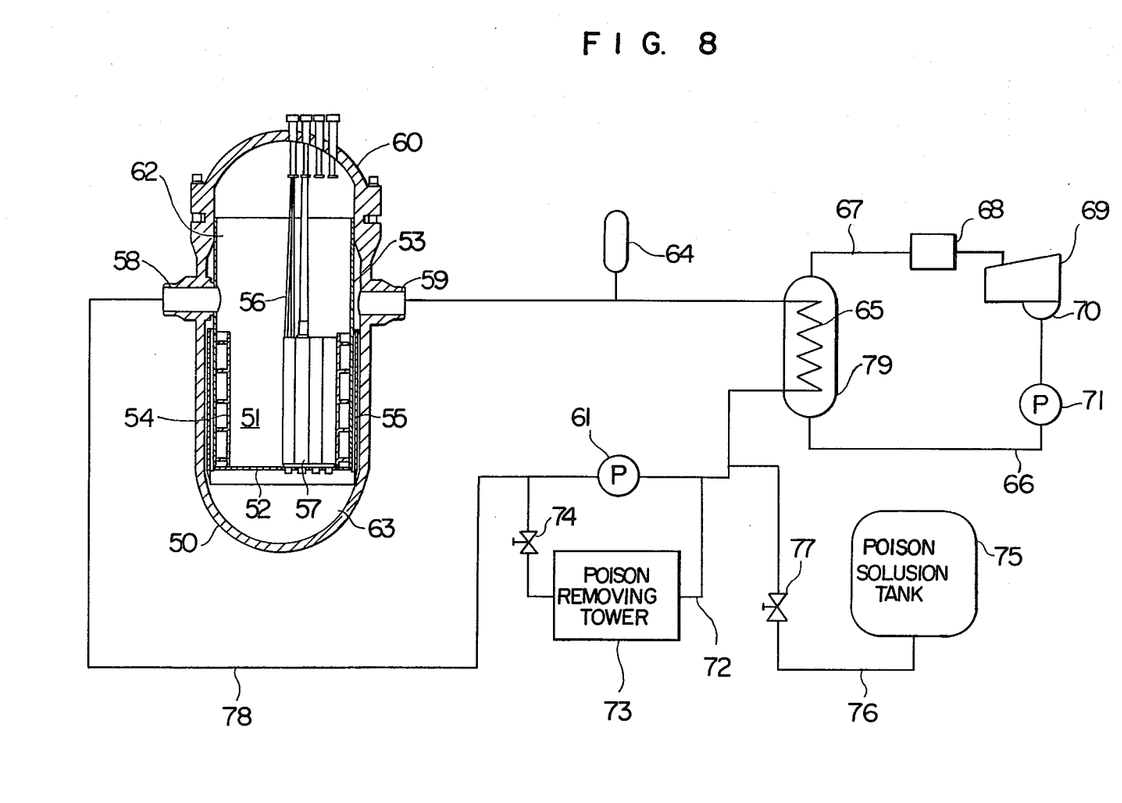
FIG. 8 is a schematic systematic diagram showing a pressurized-water reactor in which the nuclear reactor operation control process comprising another embodiment of the invention can have application.

FIG. 8 shows another embodiment of the invention which has application in a pressurized-water reactor which comprises a pressure vessel 50, a core 51, lower core support plate 52, a core tank 3 supporting the lower core support plate 52, a baffle 54 interposed between the core tank 53 and the core 51, a heat shield 55 located between the core tank 43 and the vessel 50, a number of control tubes 56 in which control rods are inserted, and fuel assemblies 57 disposed in the core 51 and mounted on the lower core support plate 52. A pressurized-water reactor is of a type in which cooling of the fuel is effected by means of pressurized water and the core 51 is immersed in water. The pressure vessel 50 whose internal pressure is kept at a relatively high level is formed with an inlet nozzle 58 and an outlet nozzle 59 for permitting a main coolant to circulate in the vessel 50. A detachable cover 60 is attached to the top of the pressure vessel 50. Actuation of a pump 61 causes cooling water to be introduced into an upper plenum 62 within the pressure vessel 50, through a primary cooling water supply line 78 and the inlet nozzle 58, and supplied to the core 51. The cooling water is heated in the core 51 and carried off, through a lower plenum 63 and the outlet nozzle 59, to a heat transfer tubing 65 in a steam generator 79 via the primary cooling water supply line 78. The internal pressure of the pressure vessel 50 and the primary cooling water supply line 78 is kept at a level of about 150 kg/cm$^2$ by means of a pressurizer 64. Actuation of a pump 71 causes water to be introduced through a condensate supply line 66 into the steam generator 79, the water being heated by the cooling water of elevated temperature flowing through the heat transfer tubing 65 and converted to steam. The steam thus generated is supplied through a main steam line 67 via a stram separator 68 to a turbine 69. After running the turbine 69, the steam is condensed by a condenser 70 into a condensate. The condensate or water is led through the condensate supply line 66 again and supplied to the steam generator 79. A line 72 bypassing the pump 61 is connected in the primary cooling water supply line 78 and mounts therein a poison removing tower and a valve 74. A poison solution tank 75 containing a charge of a liquid poison, e.g. a boric acid solution, is connected by a line 76 to a section of the primary cooling water supply line interposed between the pump 61 and the steam generator 79. A valve 77 is mounted in the line 76.

In the pressurized-water reactor constructed as aforementioned, control of reactor power is effected by operating control rods (not shown) inserted in the core 51 through the control tubes 56 and by varying the concentration of the liquid poison (specifically the concentration of boric acid) in the cooling water supplied to the core 51. The reactor power can be controlled in a finer manner by varying the concentration of the liquid poison than by manipulating the control rods. A rise in the reactor power when the pressurized-water reactor constructed as aforementioned is started will be described with reference to FIG. 7. The characteristics shown in FIG. 6 cannot be applied to a pressurized-water reactor because the horizontal axis has a different label.

When the reaction in the core 51 becomes critical, the control rods are withdrawn therefrom to cause the reactor power to rise. At this time, the valves 74 and 77 are closed. When the linear heat generating rate of nuclear fuel elements (not shown) constituting the fuel assemblies 57 in the core 51 reaches a level of about 8 KW/ft at which the PCMI begins to take place, withdrawing of the control rods from the core 51 is interrupted. The reactor power is at the point K in FIG. 7 at this time. At the point K of the reactor power, the valve 74 is opened and a portion of the cooling water which is delivered by the pump 61 and flows through the primary line 78 is supplied to the poison removing tower 73 through the line 72 and then returned to a section of the primary cooling water supply line 78 which is disposed upstream of the pump 61. Usually, the cooling water in the pressure vessel 50 and the primary cooling water supply line 78 contains the liquid poison of a predetermined concentration. The concentration of the liquid poison in the cooling water is adjusted beforehand to the predetermined level by opening the valve 77 and incorporating liquid poison from the poison solution tank 75 into the cooling water prior to starting of the reactor.

By introducing a portion of the cooling water into the poison removing tower 73, the liquid poison in such portion of the cooling water is removed therefrom, so that the concentration of the liquid poison in the body of the cooling water introduced into the core 51 is lowered. By continuing the supply of cooling water to the poison removing tower 73, the concentration of the liquid poison in the body of cooling liquid flowing through the core 51 is gradually lowered. This causes the reactor power to rise. Upon the reactor power reaching the point L, the valve 74 is closed to stop the supply of cooling water to the poison removing tower 73. The rise of reactor power from the point K to the point L takes place at a rate of increase of 0.06 KW/ft. hr of the linear heat generating rate which is lower than a critical rate which causes damage to the nuclear fuel elements by the PCMI. After the reactor power has risen slowly in this way and reached the point L, the valve 77 is opened to supply the liquid poison in the poison solution tank 75 to the body of cooling water in the primary cooling water supply line 78. This causes a sudden fall in the reactor power to the point M. When the reactor power has fallen to the point M, the valve 77 is closed. By this time, $^{135}$Xe has already been produced in the nuclear fuel elements as is the case with the embodiment shown and described previously. Thus, it is possible to withdraw the control rods again from the core 51 when the value of the reactor power is at a power level of 8 KW/ft of linear heat generating rate or in a range below this level.

If the reactor power reaches the point K again, withdrawing of the control rods is interrupted and the valve 74 is opened so as to permit a portion of the cooling water to be supplied to the poison removing tower 73. Thus the liquid poison in the cooling water is reduced in concentration. The rise in reactor power from the point K becomes sharp due to the influences of the lowering of the concentration of the liquid poison and the reduction in the amount of $^{135}$Xe in the nuclear fuel elements. After reaching the point P, the reactor power is influenced only by the lowering of the concentration of the liquid poison in the cooling water and gradually rises at a rate of increase of 0.06 KW/ft.hr of the linear heat generating rate until the reactor power reaches the point N which represent a preset reactor power level.

With the elapsing of the operating time of the nuclear reactor, the fuel in the nuclear fuel elements is consumed and the reactivity is reduced. A fall in the reactor power due to the reduction in the reactivity is compensated for by the lowering of the concentration of the liquid poison in the cooling water, whereby the reactor power can be kept at the preset level. In the event that the fall in reactor power cannot be compensated for by the lowering of the concentration of the liquid poison, the valve 74 is closed and the valve 77 is opened so as to increase the amount of liquid poison in the cooling water. This has the effect of lowering the reactor power to the point M. Then, the control rods are withdrawn from the core 51 when the value of the reactor power is at a power level of 8 KW/ft of the linear heat generating rate at which the PCMI begins to take place or in a range below this level. When the reactor power is in a region where the linear heat generating rate exceeds 8 KW/ft, the concentration of the liquid poison is lowered so as to cause the reactor power to rise to the preset level again. In this embodiment, the same results that are achieved in the first embodiment can be achieved.

It will be appreciated that this invention provides a control process which enables a nuclear reactor to operate safely without causing damage to the nuclear fuel elements.

While the invention has been particularly shown and described with reference to preferred embodiments thereof, it will be understood by those skilled in the art that the foregoing and other changes in form and details can be made therein without departing from the spirit and scope of the invention.

We claim:

1. A process of controlling operation of a nuclear reactor including a plurality of fuel elements in a reactor core each having a cladding and a plurality of fuel pellets encased in the cladding, control rods for effecting coarse control of reactor power, and means for effecting fine control of reactor power, comprising:
    a first step of withdrawing the control rods from said reactor core to cause the reactor power to rise to a first level;
    a second step of interrupting the withdrawing of the control rods and operating the fine control means while the withdrawing of the control rods is interrupted to cause the reactor power to rise from the first level to a second level higher than the first level so as to produce and accumulate neutron absorptive fission products in the fuel elements;
    a third step of operating the fine control means to cause the reactor power to fall to a third level lower than said first level by virtue of the presence of said fission products produced and accumulated in the fuel elements during the second step;
    a fourth step of restarting the withdrawing of the control rods which was interrupted to cause the reactor power to rise to a fourth level higher than said third level while the fission products produced and accumulated in the fuel elements during the second step are still present therein;
    a fifth step of again interrupting the withdrawing of the control rods when the reactor power has reached the fourth level and permitting the reactor power to rise due to the reduction of the fission products produced and accumulated in the fuel elements during the second step; and
    a sixth step of operating the second control means while the withdrawing of the control rods is interrupted to cause the reactor power to rise further.

2. A process as claimed in claim 1, wherein the fine control means comprises means for regulating the flow rate of coolant flowing through the reactor core whereby the control of the reactor power performed by the fine control means is effected by regulating the flow rate of coolant flowing through the reactor core.

3. A process as claimed in claim 1, wherein the fine control means comprises means for adjusting the concentration of liquid poison contained in coolant flowing through the reactor core whereby the control of the reactor power performed by the fine control means is effected by adjusting the concentration of said liquid poison.

4. A process as claimed in any one of claims 1, 2 or 3, wherein the fourth level of the reactor power is a level at which a pellet-clad-mechanical-interaction begins to take place between the cladding and the fuel pellets.

5. A process as claimed in any of claims 1, 2 or 3, wherein the first level of the reactor power is a level at which a pellet-clad-mechanical-interaction begins to take place between the cladding and the fuel pellets.

6. A process as claimed in claim 5, wherein the fourth level of the reactor power is equal to the first level at which the pellet-clad-mechanical-interaction begins to take place.

7. A process as claimed in claim 6, wherein the rate of rise of the reactor power effected by the operation of the fine control means is rendered at a rate lower than the critical rate at which the pellet-clad-mechanical-interaction begins to cause damage to the fuel elements.

8. A process as claimed in claim 7, wherein the rate of the reactor power rise is no greater than 0.06 Kw/ft/hr.

9. A process as claimed in claim 6, wherein the second level to which the reactor power is cause to rise during the second step is a desired maximum power level, and further comprising the step of maintaining the reactor power at the second level for a predetermined period of time after the second step with the fine control means being operated when the reactor power deviates from the second level with the progress of operation of the nuclear reactor, the operation of the third step being performed after the lapse of the predetermined period of time.

10. A process as claimed in claim 6, wherein the operations of the first, second, third, fourth and fifth steps are successively performed in the indicated order, and wherein in the sixth step the reactor power is caused to rise from the fourth level at which the pellet-clad-mechanical-interaction begins to take place to a desired maximum level higher than the second level by operating the fine control means while the withdrawing of said control rods is interrupted.

11. A process as claimed in claim 10, further comprising the step of maintaining the reactor power at the desired maximum power level by operating the fine control means when the reactor power deviates from the desired maximum level with the progress of operation of the nuclear reactor.

12. A process as claimed in any one of claims 1, 2 or 3, wherein said fission products comprises $^{135}Xe$.

13. A process as claimed in claim 1, wherein the first through sixth steps are carried out to at least initially increase the reactor power through a power-clad-mechanical-interaction range up to a predetermined operating power level for the nuclear reactor.

14. A process as claimed in claim 13, wherein the withdrawing of the control rods effects a rate of rise of the reactor power which is greater than the rate of rise of the reactor power effected by operation of the fine control means.

15. A process for controlling operation of a nuclear reactor including fuel elements in a reactor core having a cladding and fuel pellets, first control means for effecting coarse control of reactor power, and second control means for effecting fine control of reactor power, comprising the steps of at least initially increasing the reactor power through a pellet-clad-mechanical-interaction range up to a predetermined operating level for the nuclear reactor including:

operating the first control means to cause the reactor power to rise;

interrupting the operation of the first control means during the raising of the reactor power at a reactor power level no greater than the level of power at which pellet-clad-mechanical-interaction begins to take place between the cladding and the fuel pellets;

at least once decreasing the reactor power from the reactor power level at which the first control means is interrupted to a lower power level at least by the production and accumulation of neutron absorptive fission products produced by fission of the fuel pellets in the fuel elements;

at least one further time operating the first control means to increase the reactor power from the decreased lower reactor power level;

at least one further time interrupting the operation of the first control means when the reactor power is increased from the decreased lower power level; and subsequently operating the second control means while the operation of the first control means is interrupted to cause the reactor power to initially rise through the pellet-clad-mechanical-interaction range to the predetermined operating level for the nuclear reactor.

16. A process as claimed in claim 15, wherein the step of decreasing the reactor power includes operating the second control means while the first control means is interrupted to increase the reactor power from the power level at which the first control means is interrupted and then to decrease the reactor power to the lower power level lower than the power level at which the first control means is interrupted with the reactor power being decreased below the power level at which the first control means is interrupted at least by the production and accumulation of the neutron absorptive fission products.

17. A process as claimed in claim 15, wherein the first control means is first operated to cause the reactor power to rise to the power level at which pellet-clad-mechanical-interaction begins to take place, and the operation of the first control means is interrupted for a predetermined time during which the nuclear reactor power is decreased at least by the presence of the neutron absorptive fission products produced and accumulated by fission of the fuel pellets in the fuel elements.

18. A process as claimed in claim 17, wherein after the reactor power is decreased to the power level lower than the power level at which pellet-clad-mechanical-interaction begins to take place, the step of at least one further time operating the first control means includes increasing the reactor power up to the level at which pellet-clad-mechanical-interaction begins to take place.

19. A process as claimed in claim 18, wherein the step of subsequently operating the second control means includes operating the second control means while the first control means is interrupted to cause the reactor power to rise from the power level at which pellet-clad-mechanical-interaction begins to take place to the predetermined operating level for the nuclear reactor.

20. A process as claimed in claim 19, wherein the second control means comprises means for regulating the flow rate of coolant flowing through the reactor core whereby the control of the reactor power performed by the second control means is effected by regulating the flow rate of coolant flowing through the reactor core.

21. A process as claimed in claim 19, wherein the second control means comprises means for adjusting the concentration of liquid poison contained in coolant flowing the reactor core whereby the control of the reactor power performed by the second control means is effected by adjusting the concentration of the liquid poison.

22. A process as claimed in any one of claims 15, 20 or 21, wherein the first control means is a control rod means, and the step of operating the first control means includes withdrawing the control rod means from the reactor core.

23. A process as claimed in claim 19, wherein the predetermined operating level to which the reactor power is caused to rise by the subsequent operation of the second control means is a desired maximum power level for the nuclear reactor, and further comprising the step of maintaining the reactor power at the desired maximum power level by operating the second control means when the reactor power deviates from the desired maximum power level with the progress of operation of the nuclear reactor.

24. A process as claimed in claim 15, wherein the fission products comprise $^{135}$Xe.

25. A process as claimed in claim 19, further comprising the step of maintaining the reactor power at the predetermined operating power level by operating the second control means when the reactor power deviates from the predetermined operating power level with the progress of operation of the nuclear reactor.

26. A process as claimed in claim 25, further comprising the step of reducing the reactor power from the predetermined operating power level below the power level at which pellet-clad-mechanical-interaction begins to take place at least by the production and accumulation of neutron absorptive fission products produced by fission of the fuel pellets in the fuel elements.

27. A process as claimed in claim 26, further comprising the step of operating the first control means to raise the reactor power to the power level at which pellet-clad-mechanical-interaction begins to take place interrupting the operation of the first control means, and operating the second control means while the first control means is interrupted to again raise the reactor power to the predetermined operating power level of the nuclear reactor.

28. A process as claimed in claim 15, wherein the first control means is operated for increasing the reactor power at a higher rate of increase than the rate of increase effected by operation of the second control means.

29. A process as claimed in claim 19, wherein the predetermined operating level to which the reactor power is caused to rise by the subsequent operation of the second control means is a desired maximum power level, and further comprising the steps of operating the second control means to lower the reactor power from the desired maximum power level to a power level lower than the power level at which pellet-clad-mechanical-interaction begins to take place, operating the first control means to cause the reactor power to rise from the lower level of reactor power, interrupting the operation of the first control means, and operating the second control means while the first control means is interrupted to cause the reactor power to again rise to the desired maximum power level.

30. A process as claimed in claim 29, further comprising the step of maintaining the reactor power at the desired maximum power level by operation of the second control means when the reactor power deviates from the desired maximum power level with the progress of operation of the nuclear reactor.

31. A process as claimed in claim 30, wherein the second control means is operated to lower the reactor power from the desired maximum power level when the second control means is incapable of maintaining the reactor power at the desired maximum power level.

32. A process as claimed in claim 31, wherein the step of decreasing the reactor power includes operating the second control means while the first control means is interrupted to increase the reactor power from the power level at which the first control means is interrupted and then to decrease the reactor power to the lower power level lower than the power level at which the first control means is interrupted with the reactor power being decreased below the power level at which the first control means is interrupted at least by the production and accumulation of the neutron absorptive fission products.

33. A process as claimed in any one of claims 15, 16 or 32, wherein the step of decreasing the reactor power is effected more than once.

34. A process as claimed in any one of claims 15, 16 or 32, wherein the second control means is operated to increase the reactor power by increasing the operation of the second control means from a first predetermined point of operation thereof to a higher point of operation thereof and the reactor power is decreased by lowering the operation of the second control means from the higher point of operation thereof to the first point of operation thereof, the reactor power being decreased to a power level lower than the power level at the first point of operation of the second control means upon return of the second control means to the first operation point thereof at least by the production and accumulation of neutron absorptive fission products by fission of the fuel pellets in the fuel elements.

* * * * *